United States Patent
Yamawaki et al.

(10) Patent No.: US 6,274,275 B1
(45) Date of Patent: Aug. 14, 2001

(54) ALKALI STORAGE CELL EMPLOYING A SPONGELIKE METAL SUBSTRATE

(75) Inventors: Akifumi Yamawaki, Naruto; Motoo Tadokoro, Itano-gun, both of (JP)

(73) Assignee: Sanyo Electric Company, Ltd., Osaka (JP)

(*) Notice: Subject to any disclaimer, the term of this patent is extended or adjusted under 35 U.S.C. 154(b) by 0 days.

(21) Appl. No.: 09/285,727

(22) Filed: Apr. 5, 1999

Related U.S. Application Data (62) Division of application No. 08/849,890, filed as application No. PCT/JP96/02993 on Jun. 17, 1996, now Pat. No. 5,940,946.

(30) Foreign Application Priority Data

Oct. 17, 1995 (JP) .................................... 7-268126

(51) Int. Cl.$^7$ ........................................ H01M 4/80
(52) U.S. Cl. ................... 429/235; 429/206; 29/2
(58) Field of Search ................... 429/235, 206; 29/2

(56) References Cited

U.S. PATENT DOCUMENTS

| | | | |
|---|---|---|---|
| 4,251,603 | * 2/1981 | Matsumoto et al. | 429/94 |
| 4,957,543 | 9/1990 | Babjak et al. | |
| 5,312,580 | 5/1994 | Erickson et al. | |
| 5,681,673 | * 10/1997 | Hattori et al. | 429/235 |
| 5,882,822 | * 3/1999 | Iida et al. | 429/235 |

FOREIGN PATENT DOCUMENTS

| | | |
|---|---|---|
| 0 079 666 | 5/1983 | (EP) . |
| 0 721 994 | 7/1996 | (EP) . |
| 55-28240 | 2/1980 | (JP) . |
| 59-146160 | 8/1984 | (JP) . |
| 4-196060 | 7/1992 | (JP) . |
| 4-303564 | 10/1992 | (JP) . |
| 5-041215 | 2/1993 | (JP) . |
| 6-287608 | 10/1994 | (JP) . |

* cited by examiner

Primary Examiner—Carol Chaney
(74) Attorney, Agent, or Firm—Foley & Lardner (57) ABSTRACT

A belt-shaped spongelike organic high polymer sheet is subjected to stretching forces in the longitudinal and lateral directions so as to transform the approximately spindle-shaped organic high polymer units which compose the organic high polymer sheet. After this, a metal is put into voids inside the organic high polymer sheet. Then, the organic high polymer is eliminated by baking it, and the metal is sintered. As a result, a spongelike metal substrate is completed whose carbon content is 0.5% by weight or less and whose metallic lattices have a longer length/shorter length ratio of 1.7 or below. The spongelike metal substrate is filled with electrode active material to form an electrode, which is combined with a counter electrode and a separator, and coiled in the direction of the longer lengths of the lattices to form a coiled electrode assembly. The electrode assembly is used to manufacture an alkali storage cell.

2 Claims, 4 Drawing Sheets relationship between longer length/shorter length ratio and high-rate discharge characteristic

Fig.1 relationship between carbon content and carbonate ion concentration in an electrolytic solution

Fig.2 relationship among carbon content, discharge capacity rate, and decrease rate of alkali concentration of an electrolytic solution

Fig.3

Fig.4 relationship between longer length/ shorter length ratio and high-rate discharge characteristic

# ALKALI STORAGE CELL EMPLOYING A SPONGELIKE METAL SUBSTRATE

This application is a divisional of application Ser. No. 08/849,890, filed Jun. 17, 1997 now U.S. Pat. No. 5,940,946, which is a national stage of PCT/JP96/02993 filed Jun. 17, 1996.

TECHNICAL FIELD

The present invention relates to a spongelike metal substrate used as an electrode substrate of an alkali storage cell and a producing method of the substrate, and further relates to an alkali storage cell employing such a substrate and a manufacturing method of the cell.

BACKGROUND ART

Electrodes for use in alkali storage cells are classified into a sintered type and a paste type. The sintered-type electrodes have excellent current collecting performance, but they require a complicated operation for being filled with active material and cannot easily achieve high energy density. In contrast, the paste-type electrodes have good workability, allowing the substrates to be directly filled with active material and achieve dense filling of active material.

As substrates for use in the paste-type electrodes, porous metal plates and spongelike metal substrates have been used. The term "spongelike" refers to a state where a multiplicity of cells are contiguous to each other and fluid such as air or paste inside these cells can travel from one cell to another. Spongelike metal substrates made of nickel or the like (foamed nickel substrates or the like) have become the mainstream, with the growing demands for cells which have higher energy density and can be manufactured at a lower cost. The reason for the popularity of the spongelike metal substrates is due to their favorable features as follows. The spongelike metal substrates contain numerous three-dimensional spaces each of which is surrounded by metallic lattices and can be filled with solid active material in paste form directly and at high density. Furthermore, contiguous numerous metallic lattices serve as a current collector, making it unnecessary to use a conductive supporter.

Generally, a spongelike nickel substrate is prepared as follows: A spongelike organic high polymer (organic polymer, organic macromolecular substance) such as foamed urethane is plated with nickel by either electroplating, electrolessplating, or vapor deposition, then the nickel-plated high polymer is baked at a high temperature. The electrode substrate thus produced is highly porous and contains numerous metallic lattices which are composed of thin metal wires. This electrode substrate can be filled with active material at high density; however, its stretching force is weak because the lattices are composed of extremely thin metal wires. As a result, the lattices are susceptible to fracture in parts during electrode pressing process or electrode coiling process after the electrode substrate has been filled with active material. The fracture of the metallic lattices leads to the deterioration of the current collecting efficiency, and as a result, there is a problem that the electrode performance cannot improve sufficiently even if the electrode substrate is filled with active material at high density.

There is another problem that cells which employ such a spongelike nickel substrate do not necessarily achieve an expected high-temperature consecutive charge characteristic, whose cause has been unknown.

DISCLOSURE OF THE INVENTION

The present invention has been achieved to solve the above-described problems. The invention has the following construction.

(1) The first invention relates to a spongelike porous metal substrate having a multiplicity of cells connected with each other three-dimensionally for use in an alkali storage cell, which is produced by making an organic high polymer with a porous sponge structure retain a metal and baking the metal-retained organic polymer, and which contains 0.5% by weight or low of carbon.

In this construction, there is no fear that remaining carbon has a harmful influence on the electrochemical characteristic of a cell which employs the spongelike porous metal substrate. Consequently, a paste-type alkali storage cell employing this spongelike porous metal substrate can have excellent high-temperature consecutive charge characteristic.

It is preferable that the spongelike porous metal substrate whose carbon content is 0.5% by weight or low contain a multiplicity of three-dimensional spaces each of which is surrounded by lattices each having a longer length and a shorter length, that the segments of the longer lengths of the lattices which are approximately parallel to the substrate surface be directed approximately in the same direction, and that a ratio of the segments of the longer lengths of the lattices to the segments of the shorter lengths which cross the segments of the longer lengths at approximately right angles (the segments of the longer length/the segment of shorter length) be 1.7 or below.

This spongelike porous metal substrate can be filled with active material at high density, and have good current-collecting rate against active material. Consequently, an alkali storage cell employing this spongelike porous metal substrate can have excellent high-temperature consecutive charge characteristic.

(2) The second invention relates to a method of producing a spongelike porous metal substrate having a multiplicity of cells connected with each other three-dimensionally for use in an alkali storage cell by putting a metal into a multiplicity of three-dimensional voids in a belt-shaped organic polymer sheet having a porous sponge structure where the a multiplicity three-dimensional voids and approximately spindle-shaped organic polymer units, are arranged alternately burning the metal-retained organic polymer units so as to eliminate the spindle-shaped organic polymer units, and sintering the metal. The method is characterized by comprising the following processes: a longer length/shorter length ratio adjustment process for directing the longer lengths of the organic polymer units to the longitudinal direction of the organic polymer sheet, and setting the ratio of the segments of the longer lengths to the segments of the shorter lengths which cross the segments of the longer lengths at approximately right angles at 1.7 or below by adjusting applying a stretching force both in the longitudinal direction of the organic polymer sheet and in the direction which crosses the longitudinal direction at right angles; a metal retention process for putting a metal into the a multiplicity of three-dimensional voids of the organic polymer sheet in which the longer length/shorter length ratio has been adjusted; a burning process for burning the metal-retained organic polymer sheet until the amount of remaining carbon becomes 0.5% by weight or below; and a sintering process for sintering the burnt metal in a reducing atmosphere.

In this construction, it is secured to produce the spongelike metal substrate of the first invention which contains 0.5% by weight or less of carbon and also contains lattices having a longer length/shorter length ratio of 1.7 or less.

In the second invention, in order to make the substrate retain a metal, it is preferable that the belt-shaped organic high polymer sheet having lattices whose longer length/ shorter length ratio has been adjusted be subjected to metal plating or metal-containing slurry impregnating. With these processes, the belt-shaped organic high polymer sheet can retain the metal easily and without fail. It is possible to evaporate a metal as an alternative method for making the substrate retain a metal.

Furthermore, in the second invention it is preferable to employ foamed urethane as the spongelike organic high polymer. The reason for this is as follows. Foamed urethane contains numerous three-dimensional contiguous voids, and urethane constituent units surrounded by these voids can be easily transformed by applying a stretching force in the longitudinal or lateral direction. Therefore, the longer length/shorter length ratio of the foamed urethane constituent units is set at 1.7 or less with ease by balancing the stretching forces in the longitudinal direction and the direction crossing the longitudinal direction at right angles. After making the voids having this ratio retain a metal, the foamed urethane is baked (which includes being burned and sintered) to remove the foamed urethane constituent units. As a result, a lattice structure which is exclusively made of a metal remains. The shape of the lattice structure depends on the shape of the foamed urethane constituent units they had before they are baked. Therefore, when the longer length/shorter length ratio of the foamed urethane units (organic high polymer) is set at 1.7 or below, the longer length/shorter length ratio of the metallic lattices can be at 1.7 or below. The foamed urethane unit (organic high polymer unit) refers to a minimum unit of the foamed urethane (organic high polymer) which is surrounded by the three-dimensional voids.

In the second invention, it is preferable to use nickel as the metal. Nickel is easily plated, has a strong stretching force, appropriate stiffness, and excellent electronic conductivity. Therefore, a spongelike nickel substrate can be filled with electrode active material at high density, and the metallic lattices are not easily fractured while the substrate is being filled with electrode active material, and have excellent conductivity. As a result, an electrode with excellent current collecting efficiency and high energy density can be obtained.

(3) The third invention relates to an alkali storage cell employing as a generating element a coiled electrode assembly which is composed of a positive electrode, a negative electrode, and a separator provided between the electrodes. The positive electrode contains a spongelike metal substrate prepared by making an organic high polymer having a spongelike structure retain a metal, and baking the metal-retained organic high polymer. The alkali storage cell is characterized in that carbon content of the spongelike metal substrate is set at 0.5% by weight or below.

In this structure, the carbon which remains in the metal substrate has no harmful influence, so that the obtained alkali storage cell has excellent high-temperature consecutive charge characteristic. In the third invention, from the same reason as above, it is preferable that a ratio of the segments of the longer lengths of the lattices that are approximately parallel to the surface of the spongelike metal substrate to the segments of the shorter lengths which cross the segments of the longer lengths at approximately right angles be 1.7 or below, and that the segments of the longer lengths be directed approximately parallel to the direction in which the electrode assembly is coiled. In addition, it is preferable to use nickel as the metal for the spongelike metal substrate.

(4) The fourth invention relates to a method of manufacturing an alkali storage cell employing as an electrode substrate a spongelike metal substrate which is prepared by putting a metal into numerous three-dimensional voids contained in a belt-shaped organic high polymer sheet having a spongelike structure where the numerous three-dimensional voids are alternated with approximately spindle-shaped organic high polymer units, burning the metal-retained organic high polymer units so as to eliminate the spindle-shaped organic high polymer units, and sintering the metal. The method is characterized by comprising the following processes: a longer length/shorter length ratio adjustment process for directing the longer lengths of the organic high polymer units to the longitudinal direction of the organic high polymer sheet, and setting the ratio of the segments of the longer lengths to the segments of the shorter lengths which cross the segments of the longer lengths at approximately right angles at 1.7 or below by adjusting a balance between a stretching force in the longitudinal direction of the organic high polymer sheet and a stretching force in the direction which crosses the longitudinal direction at right angles; a metal retention process for putting a metal into the numerous three-dimensional voids of the organic high polymer sheet where the longer length/shorter length ratio has been set at 1.7 or below; a burning process for burning the metal-retained organic high polymer sheet until the amount of remaining carbon becomes 0.5% by weight or below; a sintering process for sintering the burnt metal in a reducing atmosphere, thereby producing a spongelike metal substrate which is composed of lattice-like metal frames; an electrode production process for filling the spongelike metal substrate with active material thereby producing an electrode; and a coiled electrode assembly production process for combining the electrode and a counter electrode with a separator provided therebetween, coiling the combined electrodes in the direction of the segments of the longer lengths of the lattices that are approximately parallel to the surface of the spongelike metal substrate.

The fourth invention is what the production method of the second invention is applied to the manufacture of an alkali storage cell by adding the electrode producing process and the coiled electrode assembly producing process thereto. In the electrode producing process of the fourth invention, active material is used to fill a spongelike metal substrate containing metallic lattices whose longer length/shorter length ratio is 1.7 or below. As a result, dense filling of active material is realized. In the subsequent coiled electrode assembly producing process, the spongelike metal substrate (electrode) filled with active material is coiled in the direction of the segments of the longer lengths of the metallic lattices. By coiling in this direction, the lattices are not easily fractured even if the lattices are filled with active material at high density. As a result, an alkali storage cell having a high active material utilization rate and a high energy density is obtained.

In the fourth invention, too, it is preferable to use either metal plating or metal-containing slurry impregnating for making the voids of the belt-shaped organic high polymer sheet retain a metal. It is also preferable to use formed urethane as the spongelike organic high polymer and nickel as the metal. The effects of these inventions will be detailed in the embodiments below.

BEST MODE FOR CARRYING OUT THE INVENTION

The present invention will be described based on the embodiments. The first embodiment employs metal plating to make the voids of the spongelike organic high polymer retain a metal such as nickel. The second embodiment employs metal-containing slurry impregnating to produce spongelike metal substrates, with which alkali storage cells are manufactured. These substrates and cells are used to clarify the relationship between carbon content of a spongelike metal substrate and the cell characteristics and the relationship between the longer length side/shorter length ratio of a spongelike metal substrate and the cell characteristics.

EMBODIMENT 1

<Production of electrode substrates and cells $A_1$–$A_6$>

First of all, a foamed urethane (organic high polymer) sheet having a length of 20 m, a width of 50 cm, a thickness of 1.8 mm, and a density of 40 to 50 $g/m^2$ was prepared. Carbon powder was spread over the sheet at a rate of about 30 g per 1 $m^2$ for the purpose of providing the sheet with electronic conductivity. Then, the sheet was subjected to a stretching force in the longitudinal direction and to the same or weaker stretching force in the lateral direction at the same time. As a result of the stretching, most of the urethane constituent units (organic high polymer units) each of which was shaped like a spindle and had a longer length and a shorter length were transformed so as to have their longer lengths in the direction parallel to the longitudinal direction of the sheet. Under these conditions, the sheet was soaked in a solution containing nickel ion and supplied with direct current to be plated with nickel.

The nickel-plated sheet was burned at 750° C. for a predetermined time period (refer to Table 1), and organic matter was eliminated. The sheet was then sintered in a reducing atmosphere. Consequently, six spongelike nickel porous substrates $A_1$–$A_6$ were obtained which differed from each other only in carbon content. The density of these substrates was 600 $g/m^2$ and the longer length/shorter length ratio of the segments of the lattices which were nearly parallel to the substrate surfaces was 1.3.

The belt-shaped spongelike nickel substrates thus obtained were each cut into a size of 4.3 cm by 8.0 cm and filled with nickel active material to form nickel positive electrodes. These nickel positive electrodes were used to manufacture six nickel-hydrogen storage cells. The manufacturing process of the cells will be detailed as follows.

A hydroxypropyl cellulose aqueous solution of 0.1% by weight of the active material was added to a mixture of 90% by weight nickel hydroxide, 7% by weight cobalt powder, and 3% by weight zinc oxide, then kneaded to form an active material paste. After being filled with this paste, spongelike nickel substrates were dried and pressed to form nickel positive electrodes. Each of these nickel positive electrodes and a well-known hydrogen-absorbing alloy negative electrode were coiled with a separator disposed therebetween to form an electrode assembly. The electrode assembly was inserted into a cell can together with an electrolytic solution which was mainly composed of KOH and had a concentration of 8N. As a result, nickel-hydrogen storage cells $A_1$–$A_6$ each having a nominal capacity of 1200 mAh were manufactured. These cells $A_1$–$A_6$ differ from each other only in carbon contents of the spongelike nickel substrates.

<Production of electrode substrates and cells $A_2X_1$–$A_2X_6$>

Six spongelike nickel substrates $A_2X_1$–$A_2X_6$ which differed from each other only in the longer length/shorter length ratio of the segments of the lattices were produced in the same manner as the spongelike nickel substrate A2 (baking conditions: 750° C. and 8 minutes), except that the nickel plating was conducted by varying the balance between the stretching forces against the foamed urethane sheet. Furthermore, these nickel substrates $A_2X_1$–$A_2X_6$ were used to manufacture six nickel-hydrogen storage cells $A_2X_1$–$A_2X_6$ in the same manner as the cell $A_2$. These cells $A_2X_1$–$A_2X_6$ commonly contain 0.3% by weight carbon and differ from each other only in the longer length/shorter length ratio of the segments of the lattices of the spongelike nickel substrates (refer to Table 2).

EMBODIMENT 2

In the second embodiment, electrode substrates $B_1$–$B_6$ and $B_2X_1$–$B_2X_6$, and cells $B_1$–$B_6$ and $B_2X_1$–$B_2X_6$ are produced in the same manner as in the first embodiment except that metal-containing slurry impregnating is employed in place of the metal plating in order to fill the voids of spongelike organic high polymer with a metal. Therefore, the description of the present embodiment is focused on the metal-containing slurry impregnating.

<Impregnating process of a metal slurry>

Nickel fine particles and phenolic resin were mixed to prepare a metal slurry solution having appropriate viscosity. On the other hand, a foamed urethane sheet was subjected to stretching forces in the longitudinal and lateral directions to make its longer length/shorter length ratio a predetermined ratio. Then, the sheet was soaked in the metal slurry solution so as to impregnate the sheet with the solution. After eliminating excess metal slurry which stuck to the surface, the sheet was sintered by being burned, and as a result, a spongelike metal substrate was obtained. In this process, the amount of the metal to be contained in the foamed urethane sheet can be controlled by adjusting the metal concentration of the metal slurry or the amount of the metal slurry with which the sheet is impregnated. Through the adjustment of these conditions, spongelike nickel, substrates each having a density of 600 $g/m^2$ were obtained.

The characteristics of the nickel substrates $B_1$–$B_6$ having different carbon contents from each other and $B_2X_1$–$B_2X_6$ having different longer length/shorter length ratios from each other according to the present embodiment are shown in Tables 3 and 4 together with other data.

The following is a description on the production principle of the spongelike nickel substrate.

Foamed urethane is composed of numerous three-dimensional voids each containing air and urethane constituent units (the main body of urethane) each being shaped like a spindle and surrounded by the voids in the manner that the voids are alternated with the urethane constituent units, thereby forming a spongelike structure.

When such foamed urethane is subjected to an external stretching force, not only the voids but also the urethane constituent units are stretched in that direction. Therefore, the longer lengths of the urethane constituent units can be directed to the longitudinal direction of the foamed urethane by applying a stretching force having an appropriate strength in that direction, whereas the urethane constituent units can be stretched in the lateral direction of the foamed urethane by applying a stretching force having an appropriate strength in the direction crossing at right angles with the longitudinal direction. Thus, the urethane constituent units can be transformed as desired by adjusting the stretching forces in the vertical and horizontal directions.

When the foamed urethane is plated with nickel after the urethane constituent units have been transformed as described above, nickel enters the three-dimensional voids, thereby surrounding the urethane constituent units. When the nickel-contained foamed urethane is burned so as to eliminate the foamed urethane, only nickel section remains. By sintering this nickel structure, a spongelike nickel substrate composed of numerous metallic lattices is obtained. The metallic lattices have substantially the same shape as the urethane constituent units. Therefore, the adjustment of the longer length/shorter length ratio of the urethane constituent units (organic high polymer units) makes it possible to set the longer length/shorter length ratio of the lattices of the spongelike nickel substrate as desired.

The strength of the stretching forces in the longitudinal and lateral directions should be determined by considering the susceptibility of the spongelike organic high polymer sheet material to stretch and fracture. At least, it is preferable that the stretching forces are strong enough to eliminate waves (wrinkles) of the spongelike high polymer sheet.

Since the sizes and shapes of the spongelike organic high polymer units are not uniform, the sizes and shapes of the space units (unit spaces surrounded by lattices) in the spongelike metal substrate which are formed by baking the high polymer units are not uniform, either. Therefore, the longer length/shorter length ratio which is referred to in this specification indicates a mean value. To be more specific, 10 lattices (organic high polymer units) which were nearly parallel to the substrate surface were picked out at random, and the longer lengths and the shorter lengths of these lattices were measured in the direction parallel to the substrate surface, by using a scanning electron microscope. Then, the 10 longer lengths and the 10 shorter lengths were averaged, respectively.

In this specification, the longer length refers to a segment which is as long as or longer than a shorter length which crosses with the longer length at approximately right angels.

<Evaluation of electrochemical features>

The electrochemical features of the nickel substrates which had been produced as above were evaluated by the following measurements. The measuring conditions and the results are described as follows.

(Measurement of carbon content rate)

A predetermined amount of spongelike nickel substrate was put in a sealed-type heating furnace having no carbon generating source, and heated to about 1000° C. in an atmosphere of oxygen. Then, gas inside the furnace was obtained and $CO_2$ concentration of the gas was measured by infrared spectrophotometry.

(Measurement of carbonate ion concentration)

An electrolysis solution was extracted from each storage cell and the carbonate ion concentration of the electrolysis solution was measured by acid-base titration with hydrochloric acid.

(Measurement of discharge capacity rates)

After each cell was charged for 16 hours with a current of 0.1C (120 mA) at 25° C. and then discharged with a current of 1C until the cell voltage became 1 V, the discharge capacity M1 was measured. Then, after each cell was continuously charged for 14 days with a current of 0.2C (240 mA) at 60° C. and discharged with a current of 1C at 25° C. until the cell voltage became 1 V, the discharge capacity M2 was measured. The discharge capacity rate before and after the high-temperature consecutive charge was calculated from M2/M1.

(Measurement of active material utilization rates)

An open-system simple cell was prepared and this cell was used to measure the active material utilization rate as follows: The simple cell having a theoretical capacity of 360 mAh was prepared by using each nickel electrode which had been prepared with the spongelike nickel substrate, a nickel plate as a counter electrode, and a 25% by weight potassium hydroxide aqueous solution as an alkaline electrolytic solution. Then, this simple cell was charged for 24 hours with a current of 36 mA and discharged with a current of 120 mA until the discharge end voltage against the nickel plate became −0.8 V. The discharge capacity Y at this moment was found. The discharge capacity Y was used to calculate the active material utilization rate from the following equation:

active material utilization rate=[discharge capacity Y/cell theoretical capacity]×100

(Measurement of high-rate discharge characteristic)

The discharge capacities $Wc_1$ (1C discharge), $Wc_2$ (2C discharge), and $Wc_4$ (4C discharge) of each storage cell were measured in the following conditions and the high-rate discharge characteristic was obtained from the equation:

{[$Wc_2$ or $Wc_4$]/$Wc_1$}×100

(1) Each cell was charged for 16 hours with a current of 0.1C and discharged with a current of 1C until the cell voltage became 1 V, and the discharge capacity Wc1 was measured.

(2) Each cell was again charged for 16 hours with a current of 0.1C and discharged with a current of 2C until the cell voltage became 1 V, and the discharge capacity $Wc_2$ was measured.

(3) After the measurement of $Wc_2$, each cell was rested for five minutes and then discharged with a current of 1C until the cell voltage became 1 V. Then, each cell was again charged for 16 hours with a current of 0.1C and discharged with a current of 4C until the cell voltage became 1 V, and the discharge capacity $Wc_4$ was measured.

(The test results)

The carbon content rate of each spongelike nickel substrate and the test results of each storage cell are shown in Tables 1–4. Also, the results in the first embodiment shown in Tables 1 and 2 are expressed in the graphs of FIGS. 1–4.

As apparent from the test results shown in tables 1–4, almost no difference is recognized among the different ways for making the substrates retain metals. Therefore, the following description will be focused on the relationship between carbon content and the electrochemical characteristics and the relationship between the longer length/shorter length ratio and the electrochemical characteristic of the spongelike nickel substrate, based on the results of the first embodiment which employs metal plating shown in Tables 1 and 2, and FIGS. 1–4.

TABLE 1

(METAL PLATING)

| CELLS | baking conditions and characteristics of Ni substrate ||| test results after high-temperature consecutive charge |||
|---|---|---|---|---|---|---|
| | baking condition: heating time (min.) at 750° C. | carbon content (%) | longer length/ shorter length ratio of Ni substrate | high-temperature discharge capacity rate (%) | carbonate ion concentration (N) | decreasing rate of the concentration of electrolytic solution (%) |
| $A_1$ | 10 | 0.1 | 1.3 | 55.8 | 2.89 | 18.1 |
| $A_2$ | 8 | 0.3 | " | 55.7 | 2.92 | 18.3 |
| $A_3$ | 6 | 0.5 | " | 55.2 | 2.99 | 18.8 |
| $A_4$ | 5 | 0.6 | " | 45.0 | 4.76 | 29.8 |
| $A_5$ | 3 | 0.8 | " | 24.3 | 5.43 | 34.0 |
| $A_6$ | 1 | 1.0 | " | 6.1 | 5.95 | 37.3 |

TABLE 2

(METAL PLATING)

| CELLS | baking conditions and characteristics of Ni substrate ||| cell test results |||
|---|---|---|---|---|---|---|
| | baking condition: heating time (min.) at 750 C. | carbon content (%) | longer length/ shrter length ratio of Ni substrate | active material utilization rate (%) | 2C high- rate discharge characteristics (%) | 4C high- rate discharge characteristics (%) |
| $A_2X_1$ | 8 | 0.3 | 1.0 | 84.6 | 93.8 | 86.5 |
| $A_2X_2$ | " | " | 1.3 | 83.4 | 92.9 | 84.3 |
| $A_2X_3$ | " | " | 1.5 | 82.7 | 92.1 | 83.2 |
| $A_2X_4$ | " | " | 1.7 | 82.5 | 91.9 | 82.5 |
| $A_2X_5$ | " | " | 1.8 | 79.3 | 87.6 | 73.6 |
| $A_2X_6$ | " | " | 2.0 | 71.2 | 80.1 | 60.3 |

TABLE 3

(METALLIC SLURRY IMPREGNATION)

| CELLS | baking conditions and characteristics of Ni substrate ||| test results after high-temperature consecutive charge |||
|---|---|---|---|---|---|---|
| | baking condition: heating time (min.) at 750° C. | carbon content (%) | longer length/ shorter length ratio of Ni substrate | high-temperature discharge capacity rate (%) | carbonate ion concentration (N) | decreasing rate of the concentration of electrolytic solution (%) |
| $B_1$ | 10 | 0.1 | 1.3 | 55.3 | 2.88 | 18.0 |
| $B_2$ | 8 | 0.3 | " | 55.1 | 2.93 | 18.3 |
| $B_3$ | 6 | 0.5 | " | 54.9 | 3.00 | 18.8 |
| $B_4$ | 5 | 0.6 | " | 44.7 | 4.78 | 29.9 |
| $B_5$ | 3 | 0.8 | " | 23.8 | 5.44 | 34.0 |
| $B_6$ | 1 | 1.0 | " | 5.9 | 5.97 | 37.3 |

TABLE 4

(METALLIC SLURRY IMPREGNATION)

| CELLS | baking conditions and characteristics of Ni substrate ||| cell test results |||
|---|---|---|---|---|---|---|
| | baking condition: heating time (min.) at 750 C. | carbon content (%) | shrter length ratio of Ni substrate | active material utilization rate (%) | 2C high- rate discharge characteristics (%) | 4C high- rate discharge characteristics (%) |
| $B_2X_1$ | 8 | 0.3 | 1.0 | 84.3 | 93.3 | 86.2 |
| $B_2X_2$ | " | " | 1.3 | 83.0 | 92.6 | 84.0 |
| $B_2X_3$ | " | " | 1.5 | 82.2 | 91.7 | 82.8 |
| $B_2X_4$ | " | " | 1.7 | 82.0 | 91.3 | 82.1 |
| $B_2X_5$ | " | " | 1.8 | 78.8 | 87.4 | 73.2 |
| $B_2X_6$ | " | " | 2.0 | 70.9 | 79.8 | 59.9 |

Figure 1:
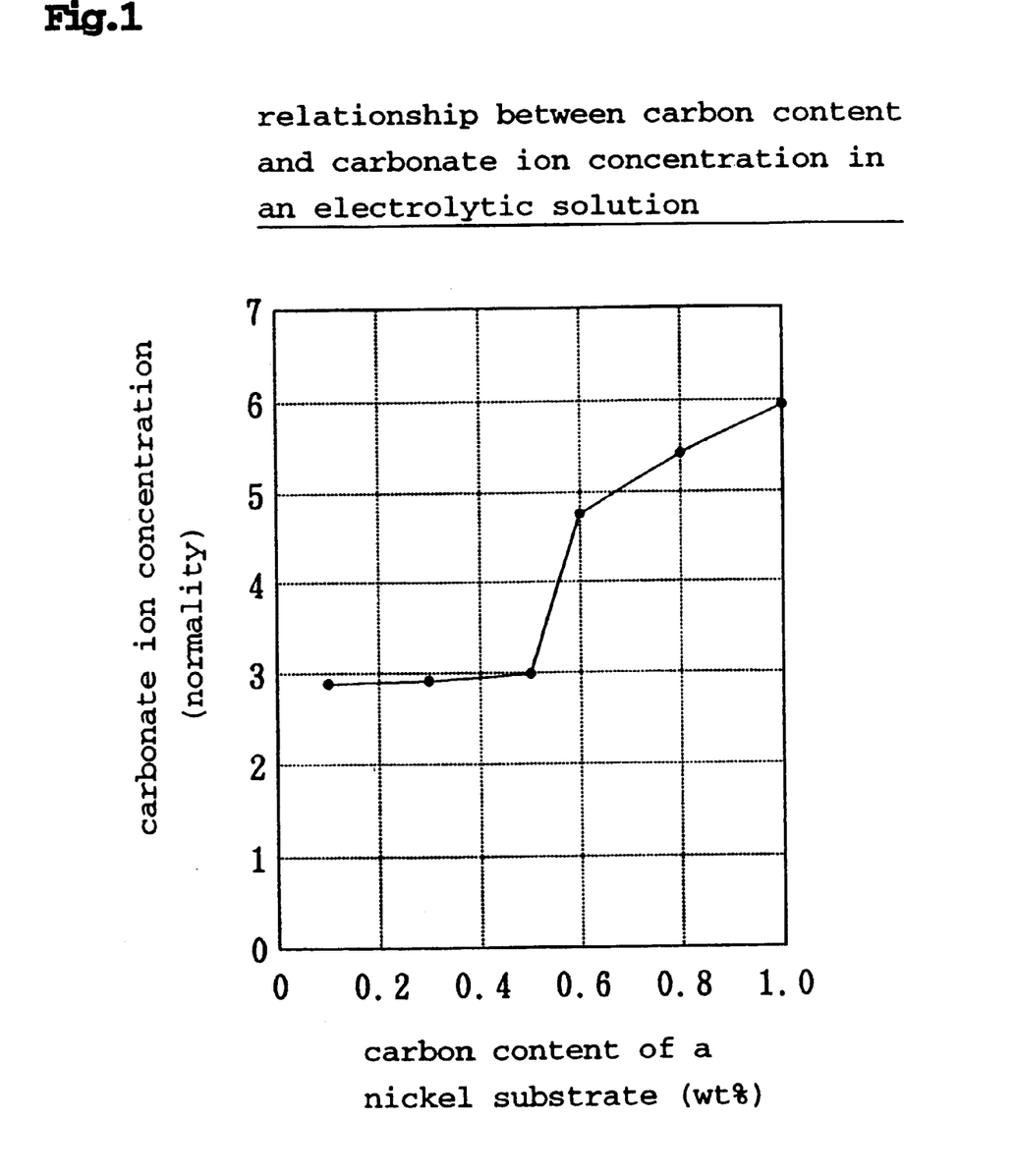
FIG. 1 is a graph which shows the relationship between carbon content of a spongelike nickel substrate and the concentration of carbonate ion of an alkali electrolytic solution.
Figure 2:
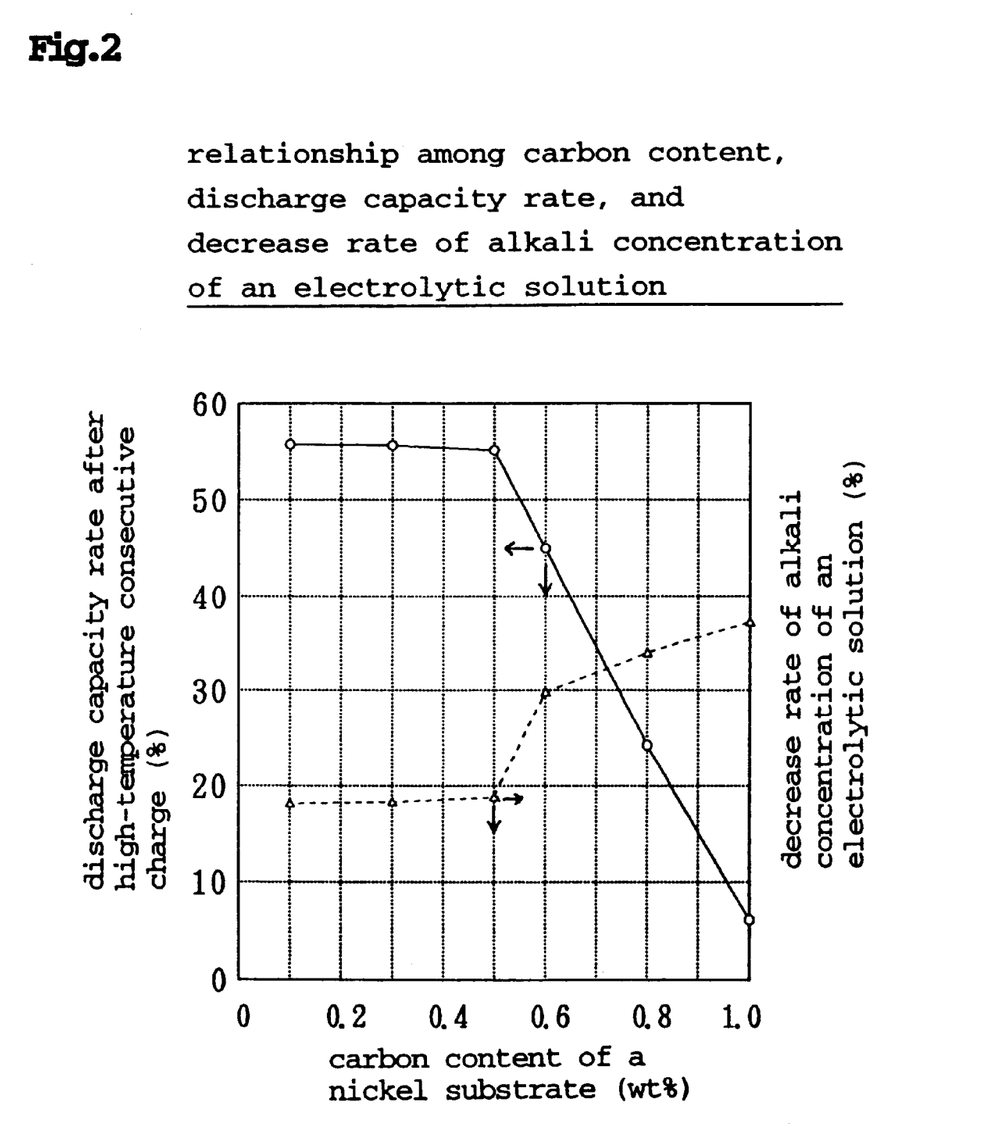
FIG. 2 is a graph which shows the relationship among carbon content of a spongelike nickel substrate, a decrease rate of the alkali concentration of the alkali electrolytic solutions, and a discharge capacity rate (%) after high-temperature consecutive charge.

FIG. 1 shows the relationship between carbon content of a spongelike nickel substrate and the concentration (normality) of carbonate ion of an alkali electrolytic solution. FIG. 2 shows the relationship among carbon content of a spongelike nickel substrate, a discharge capacity rate after high-temperature consecutive charge, and a decrease rate of the alkali concentration of the alkali electrolytic solutions.

FIG. 1 indicates that carbonate ion in a alkali electrolytic solution increases as carbon content of a spongelike nickel substrate increases, especially when carbon content exceeds 0.5% by weight. The dotted line with the symbol Δ indicates that an increase in the carbonate ion in an alkali electrolytic solution is directly related to a decrease in the alkali concentration of the electrolytic solution. Furthermore, the full line with the symbol ○ which shows the relationship between carbon content and the discharge ratio indicates that the discharge capacity after high-temperature consecutive charge drops suddenly when carbon content of a spongelike nickel substrate exceeds 0.5% by weight.

These results prove that when a cell is continuously charged at a high temperature, carbon contained in the nickel substrate reacts with an alkali electrolytic solution and change into carbonate ion, thereby decreasing the concentration of the alkali electrolytic solution; however, when carbon content is set at 0.5% by weight or below, the discharge characteristic after the high-temperature consecutive charge does not drop largely. Thus, in the process of producing a spongelike nickel substrate by plating a spongelike organic high polymer with a metal and then baking the organic high polymer, it is necessary to set the carbon content of the nickel substrate at 0.5% by weight or below.

On the other hand, we inventors have confirmed that carbon content of the conventional spongelike nickel substrate used in this type of storage cell is about 1% by weight. From this, it is obvious that the conventional alkali storage cell is inferior to the storage cell of the present invention in high-temperature consecutive charge characteristic.

Figure 3:
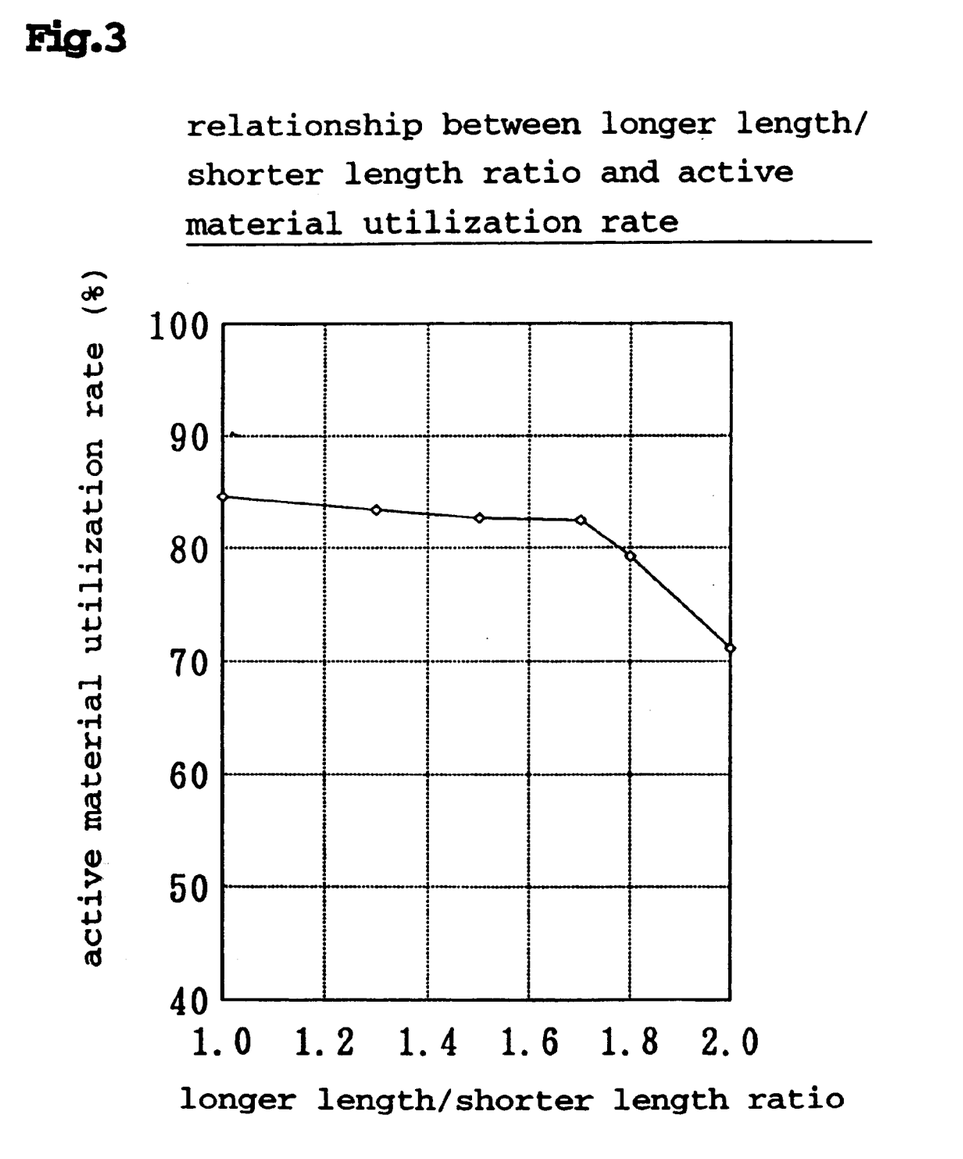
FIG. 3 is a graph which shows the relationship between the longer length/shorter length ratio of a spongelike nickel substrate and the active material utilization rate (%) of the positive electrode.

FIG. 3 shows the relationship between the longer length/shorter length ratio of a spongelike nickel substrate and the active material utilization rate. FIG. 3 indicates that the active material utilization rate decreases as the longer length/shorter length ratio increases. However, the decrease in the active material utilization rate is slight when the longer length/shorter length ratio is in a range of 1.0 to 1.7 and becomes remarkable when the ratio exceeds 1.7.

The reason for this result seems to be as follows. The spongeilke nickel substrate consists of numerous contiguous lattices which are composed of thin nickel wires. Therefore, these lattices are susceptible to fracture if a strong stretching force is applied during electrode pressing process or electrode coiling process after the electrode substrate has been filled with active material. When the electrode pressing or electrode coiling process has been done in the direction parallel to the longer lengths of the lattices, a strong stretching force is applied in that direction, so that the longer lengths are susceptible to fracture. On the other hand, the contiguous lattices not only retain active material but also function as a current collector. Therefore, when the lattices are fractured, the current collecting performance of the substrate deteriorates, thereby decreasing the active material utilization rate.

As for the relationship between the shape of the lattices which compose a spongelike nickel substrate and its fracture, when the lattices have appropriate shorter lengths against the longer length, the lattices can become flatter in the direction of the longer lengths in accordance with the strength of the stretching force in that direction. In other words, since the transformation of the lattices can absorb or mitigate the stretching force to some extent, the lattices are prevented from fracturing. In contrast, when the lattices have originally flat-shaped with a large longer length/shorter length ratio, the lattices cannot become further flatter in response to a stretching force partly because the lattice spaces are filled with active material. As a result, the lattices are easily fractured.

The reason for the results shown in FIG. 3 seem to be that when the longer length/shorter length ratio is 1.7 or below, the lattices become flatter, thereby absorbing or mitigating the stretching force in the direction of the longer lengths, so that no breakage is caused. Thus, when the longer length/shorter length ratio of the spongelike nickel substrate is set at 1.7 or below, the lattice breakage during the cell assembly process can be reduced and the current collecting performance of the electrodes can be improved.

Figure 4:
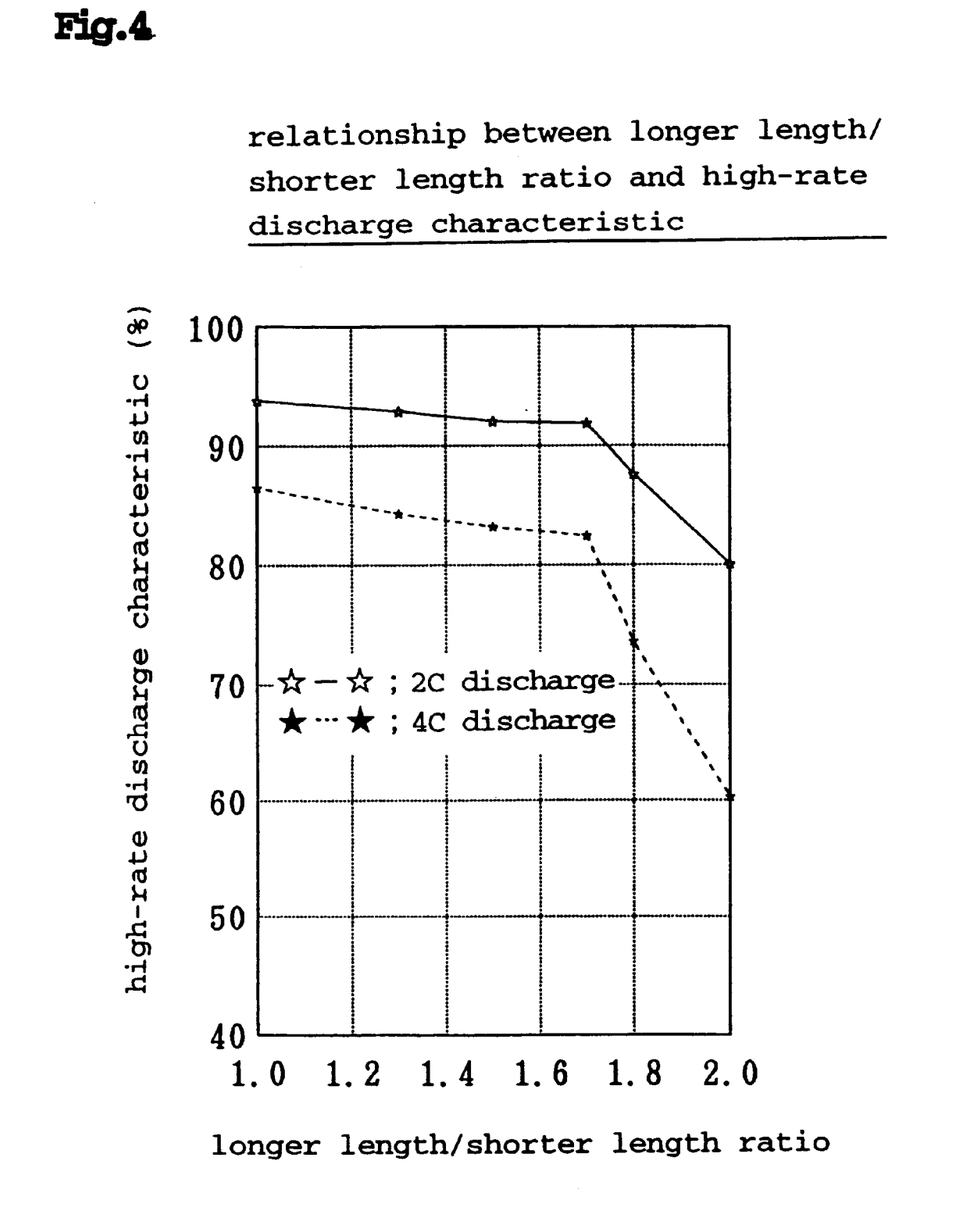
FIG. 4 is a graph which shows the relationship between the longer length/shorter length ratio of a spongelike nickel substrate and the high-rate discharge characteristic value (%) of an alkali storage cell.

FIG. 4 shows the relationship between the longer length/shorter length ratios and the high-rate discharge characteristic. FIG. 4 proves the same thing as explained above. That is, when the longer length/shorter length ratio is 1.7 or below, the electrode composed of a nickel substrate has good current collecting performance (conductivity), so that the high-rate discharge characteristic can be improved.

As explained hereinbefore, an alkali storage cell which employs a spongelike metal substrate as an electrode substrate in accordance with the present invention suffers from no decrease in the alkali concentration of the electrolytic solution or in the active material utilization rate both of which result from the substrate, and no decrease in the high-rate discharge characteristic. As a result, the present invention can draw out an advantageous feature of the spongelike metal substrate of capable of being filled with active material at high density, thereby further enhancing the alkali storage cell performance.

(Others)

In these embodiments, a spongelike organic high polymer is impregnated with nickel by electrolytic plating and metal-containing slurry impregnation; however, other processes can be used instead. For example, vapor deposition and electrolessplating can be used in place of electroplating.

POSSIBILITY OF INDUSTRIAL USE

As explained hereinbefore, an alkali storage cell which employs a spongelike metal substrate as an electrode substrate in accordance with the present invention suffers from no decrease in the alkali concentration of the electrolytic solution or in the active material utilization rate both of which result from the substrate, and no decrease in the high-rate discharge characteristic. As a result, the present invention can draw out an advantageous feature of the spongelike metal substrate of capable of being filled with active material at high density, thereby further enhancing the alkali storage cell performance. Therefore, the present invention has a great industrial significance.

What is claimed is:

1. An alkali storage cell employing as a generating element a coiled electrode assembly composed of a positive electrode, a negative electrode, and a separator provided between the electrodes, said positive electrode comprising a spongelike porous metal substrate in which an active material comprising nickel hydroxide is retained, said porous metal substrate produced by filling a metal into an organic polymer having a porous sponge structure and thereafter baking the metal-retaining polymer, said porous metal substrate characterized in that:

a carbon content of said porous metal substrate is set at 0.5 wt. % or lower;

said porous metal substrate has a multiplicity of three-dimensional voids each surrounded by a lattice having a longer length and a shorter length;

a ratio of a segment of said longer length to a segment of said shorter length is greater than 1 and less than or equal to 1.7, where said segment of said longer length is approximately parallel to a surface of said porous metal substrate and said segment of said shorter length crosses said segment of said longer length approximately at a right angle, and said segment of said longer length is directed to a direction approximately parallel to a direction in which said coiled electrode assembly is wound.

2. An alkali storage cell in accordance with claim 1, in which said lattice consists of nickel.

* * * * *